US008302425B2

(12) United States Patent
Yanagi

(10) Patent No.: US 8,302,425 B2
(45) Date of Patent: Nov. 6, 2012

(54) REGENERATIVE ADSORPTION SYSTEM WITH A SPRAY NOZZLE FOR PRODUCING ADSORBATE VAPOR AND CONDENSING DESORBED VAPOR

(75) Inventor: Hideharu Yanagi, Singapore (SG)

(73) Assignee: Cyclect Singapore Pte Ltd., Singapore (SG)

(*) Notice: Subject to any disclaimer, the term of this patent is extended or adjusted under 35 U.S.C. 154(b) by 682 days.

(21) Appl. No.: 11/596,266

(22) PCT Filed: May 11, 2004

(86) PCT No.: PCT/SG2004/000127
§ 371 (c)(1),
(2), (4) Date: Sep. 7, 2007

(87) PCT Pub. No.: WO2005/108880
PCT Pub. Date: Nov. 17, 2005

(65) Prior Publication Data
US 2008/0034785 A1    Feb. 14, 2008

(51) Int. Cl.
*F25B 17/08*    (2006.01)
(52) U.S. Cl. .................. 62/480; 62/478; 62/94; 62/271
(58) Field of Classification Search .............. 62/478, 62/480, 94, 271
See application file for complete search history.

(56) References Cited

U.S. PATENT DOCUMENTS 5,534,186 A * 7/1996 Walker et al. ................. 252/194
6,041,617 A * 3/2000 Sanada et al. ................... 62/480

FOREIGN PATENT DOCUMENTS

JP          06300385 A  * 10/1994
WO    WO 02/066901 A1 *  8/2002

OTHER PUBLICATIONS

Machine translation of JP06-300385 Sep. 28, 2010.*

* cited by examiner

*Primary Examiner* — Cheryl J Tyler
*Assistant Examiner* — Jonathan Koagel
(74) *Attorney, Agent, or Firm* — Marshall, Gerstein & Borun LLP

(57) ABSTRACT

The invention discloses a regenerative adsorption system (50). The system includes at least two reactors (60, 70) capable of operating in an adsorption mode and a desorption mode and two liquid atomization units (62, 72) respectively in fluid communication with the reactors (60, 70). The liquid atomization units (62, 72) being capable of atomizing liquid to form adsorbate vapor or to condense desorbed vapor. In operation, the reactor in the adsorption mode adsorbs the adsorbate vapor and the reactor in the desorption mode produces desorbed vapor that is condensed by the atomised liquid.

18 Claims, 11 Drawing Sheets

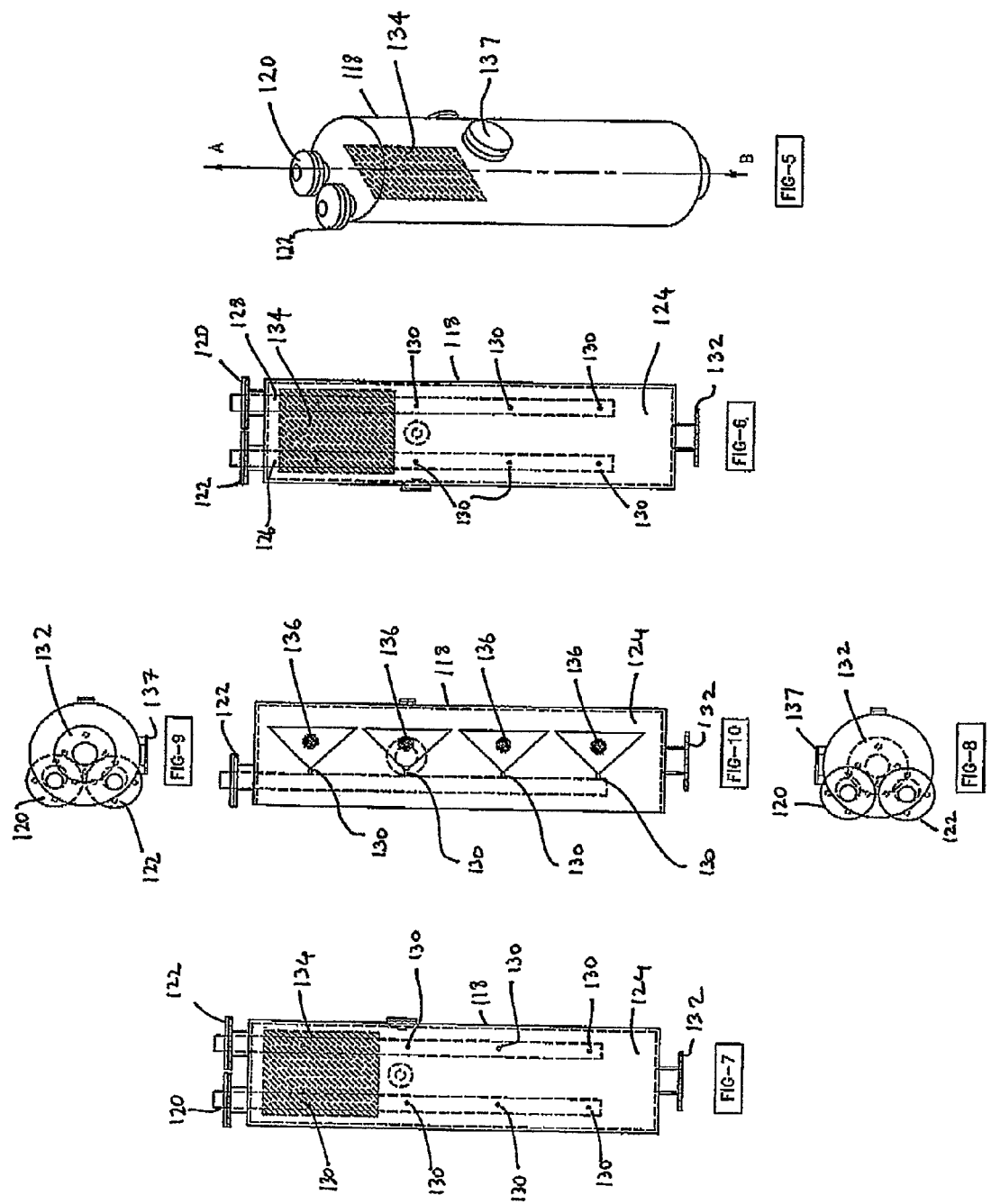

REGENERATIVE ADSORPTION SYSTEM WITH A SPRAY NOZZLE FOR PRODUCING ADSORBATE VAPOR AND CONDENSING DESORBED VAPOR

TECHNICAL FIELD

The present invention generally relates to a regenerative adsorption system and to a regenerative adsorption process.

BACKGROUND

Adsorption is a process whereby one or more components (an adsorbate) in a fluid phase are transfer to, and accumulate on, the surface of a solid adsorbent. Desorption is the reverse process of adsorption and involves the transfer of an adsorbate from a solid adsorbent to a fluid phase.

The process of adsorption is exothermic while the reverse desorption process is endothermic. As adsorption and desorption are heat exchange processes, adsorption and desorption can be utilised in heating and cooling applications.

In recent years there has been growing interest in the use of "adsorption chillers" that utilise water as a refrigerant. A major advantage of these adsorption chillers is that they can chill water in an adsorption mode and then utilise "waste heat" to regenerate the adsorbent in a desorption mode. Known adsorption chillers are capable of utilising heat as low as 70° C. to produce cooled water in the range of 5° C. to 15° C.

A schematic diagram of a known adsorption chiller is shown in FIG. 1. This adsorption chiller comprises two reactor chambers 10 and 20 respectively having two heat exchangers 12 and 22 that are disposed within a solid adsorbent bed. The two reactor chambers 10 and 20 are housed within a vacuum chamber and are in fluid communication with a condenser 30 that has a plurality of copper fin tube and shell tubes 30a that are in fluid communication with a cooling water source 32. The reactor chambers 10 and 20 are also in fluid communication with an evaporator 40 that has a plurality of copper fin tube and shell tubes 40a that are thermally coupled to a falling film type heat exchanger 42. The heat exchanger 42 accommodates the chilled water stream.

The evaporator 40 and condenser 30 are capable of being in fluid communication with the respective chambers 10 and 20 by large diameter vapor valves (14a,14b,14c,14d). The large diameter vapor valves (14a,14b,14c,14d) are provided to reduce the pressure drop between the reactor chambers 10 and 20 operating in vacuum and the condenser 30 and the evaporator 40.

The adsorption chiller of FIG. 1 is shown operating with the reactor chamber 10 in adsorption mode and the reactor chamber 20 in desorption mode. The operation of the adsorption chiller is as follows. The reactor chamber 10 charged with the solid adsorbent adsorbs water vapor that has been evaporated from liquid water brought into the evaporator 40. The evaporated water from the evaporator 42 passes through open valve 14a to the reactor chamber 10 (valve 14D is closed).

Evaporation of liquid water from the evaporator 40 is driven by the adsorption process, the heat transferred by the latent heat of evaporation causes the fluid in heat exchanger 42 to cool down. The cooled water exchanges heat with water passing through heat exchanger 42 so that the outlet water of heat exchanger 42 becomes "chilled water". The chilled water from heat exchanger 42 may be used as a refrigerant for cooling applications.

In FIG. 1, the reactor chamber 20 is charged with an adsorbent material that has been charged or saturated with water vapor. Hot water from a heat source passes through heat exchanger 22 causing the reactor 10 to operate in the desorption mode whereby water vapor is driven off and passes through open valve 14b (valve 14C is closed) to be condensed in the condenser 30 as cooling water passes through heat exchanger 32.

At the end of the adsorption cycle in reactor 10 and the desorption cycle in reactor 20, the valves 14a and 14b are closed and valves (14C,14D) are open to reverse the process so that reactor chamber 10 operates in the desorption mode and reactor chamber 20 operates in the adsorption mode. Because the adsorption chiller is capable of operating in an adsorption mode and a desorption mode, the process is known as "regenerative adsorption".

A disadvantage with known adsorption chillers is that the vapor valves (i.e. valves 14a,14b) are expensive and increase the cost of the adsorption chilling system. Furthermore, the use of copper shell and tubes within the condenser 30 and evaporator 40 for heat exchanges are expensive and add to the overall cost of the regenerative adsorption system.

A further disadvantage with known adsorption chillers is that the heat transfer coefficients of the heat exchangers is at most 3,500 W/m$^2$K. Accordingly, large sized heat exchangers are required relative to the chilling duty of the adsorption chillers.

There is a need to provide a regenerative adsorption system that overcomes or at least ameliorates one or more of the disadvantages described above.

There is a need to provide a regenerative adsorption system that has a high heat transfer coefficient relative to that of an adsorption chillers as described above.

There is a need to provide a regenerative adsorption system that does not need to utilise vapor valves between the reactor chamber and the associated evaporator or condenser.

SUMMARY OF INVENTION

According to a first aspect of the invention, there is provided a regenerative adsorption system comprising:

a reactor containing adsorbent material, the reactor capable of operating in an adsorption mode and a desorption mode; and a liquid atomisation unit in fluid communication with the reactor, the liquid atomisation unit capable of atomising liquid for forming adsorbate vapor or for condensing desorbed vapor;

wherein in the adsorption mode, the adsorbent material in the reactor at least partially adsorbs the adsorbate vapor and wherein in the desorption mode, the adsorbent material reactor produces desorbed vapor that is at least partially condensed by the atomised liquid.

According to a second aspect of the invention, there is provided a regenerative adsorption process used in an adsorption system that comprises a reactor containing adsorbent material, the reactor capable of operating in an adsorption mode and a desorption mode, the regenerative adsorption process comprising the steps of:

atomising a liquid to form adsorbate vapor or to condense desorbed vapor; and passing adsorbate vapor to the adsorbent material within the reactor when operating in an adsorption mode; or condensing, using the atomised liquid, desorbed vapor generated from the adsorbent material when the reactor is operating in the desorption mode.

According to a third aspect of the invention, there is provided an adsorption chilling system comprising:

a pair of reactors containing adsorbent material, the reactors capable of operating in an adsorption mode and a desorption mode; and a pair of liquid atomisation units that are respectively in fluid communication with the pair of reactors, the liquid atomisation units being capable of at least partially atomising a liquid to form an adsorbate vapor or at least partially condensing a desorbed vapor;

wherein in use, the pair of reactors alternate between respectively operating in the adsorption mode and the desorption mode, wherein the adsorbent material of the reactor operating in the adsorption mode adsorbs adsorbate vapor from the liquid atomisation unit and adsorbent material of the reactor operating in the desorption mode generates desorbed vapor that is passed to the liquid atomisation unit to be condensed by the atomised liquid; and wherein liquid present in the liquid atomisation unit in fluid communication with the reactor operating in the adsorption mode is caused to cool in temperature to become chilled liquid capable of being used as a refrigerant.

According to a fourth aspect of the invention, there is provided a regenerative adsorption process comprising:

atomising a liquid to form adsorbate vapor or to condense desorbed vapor; and passing adsorbate vapor to adsorbent material in a reactor, when the reactor is operating in an adsorption mode; or condensing, using the atomised liquid, desorbed vapor generated from adsorbent material in the reactor, when the reactor is operating in the desorption mode.

DEFINITIONS

The following words and terms used herein shall have the meaning indicated:

The word "vapor" and grammatical variations thereof, is to be interpreted broadly to refer to a fluid in the gas phase.

The term "coolant liquid" refers to a liquid agent that produces cooling.

The term "heated liquid" or "heating liquid" and grammatical variations thereof, refers to a liquid agent that produces heating.

The word "adsorbate" relates to a substance that is capable of being adsorbed or accumulated on the surface of an adsorbent.

The word "adsorbent" refers to a material that is capable of adsorption.

DISCLOSURE OF EMBODIMENTS

Exemplary non-limiting embodiments of regenerative adsorption systems will now be disclosed.

The disclosed embodiments describe a novel regenerative adsorption system that includes a reactor that contains adsorbent material, the reactor being able to operate in an adsorption mode and a desorption mode. The novel regenerative adsorption system also includes a liquid atomisation unit that is in fluid communication with the reactor. The liquid atomisation unit is able to atomise liquid to form adsorbate vapor or to condense desorbed vapor. In operation, when the reactor is in the adsorption mode, the adsorbent material adsorbs the adsorbate vapor. When the reactor is in the desorption mode, the adsorbent material produces desorbed vapor that is condensed by the atomised liquid.

Advantageously, liquid present in the liquid atomisation unit in fluid communication with the reactor that operates in the adsorption mode may be caused to cool in temperature to become cooled liquid capable of being used as a refrigerant. Accordingly, the novel regenerative adsorption system can be operated as an adsorption chilling system for chilling fluids such as water. In one embodiment, waste heat may advantageously be used to drive the desorption mode of the regenerative adsorption system.

The adsorbate vapor may be transmitted directly from the liquid atomisation unit to the reactor when operating in the adsorption mode. Furthermore, the desorbate vapor may be transmitted directly to the liquid atomisation unit from the reactor when operating in the desorption mode. Advantageously, adsorbate vapor and desorbed vapor can be transferred between the liquid atomisation unit and the reactors without the use of any valves such as vapor valves.

The large surface area of the atomised liquid advantageously results in relatively high heat transfer between the adsorbate vapor and the desorbed vapor. In one embodiment, the heat transfer coefficients of the liquid atomisation units may advantageously be greater than 3,500 W/m²K.

In one embodiment, two liquid atomisation units may be provided in the regenerative adsorption system. In other embodiments a plurality of N liquid atomisation units may be provided, wherein N/2 liquid atomisation units operate in the adsorption mode and N/2 liquid atomisation units operate in the desorption mode. In yet other embodiments, an uneven number of liquid atomisation units may be provided in the regenerative adsorption system.

The liquid atomisation unit may be a vessel comprising a chamber having one or more liquid atomisation devices located therein. The liquid atomisation devices may be in the form of nozzles capable of ejecting a spray or jet of liquid therefrom. A plurality of nozzles may be mounted within the chamber. The nozzles may be mounted on a nozzle head. A plurality of nozzle heads provided with a plurality of nozzles thereon may be provided in the chamber. The nozzle heads may extend substantially throughout the chamber.

In one embodiment, the nozzle heads may be pipe fitted with a liquid inlet at one end and may be sealed at the other. The pipe may have a plurality of outlet orifices extending along its surface, each of the outlet orifices being associated with a spray.

In one embodiment, the nozzle may be a flat spray nozzle. The diameter of the orifice provided in the spray may be in the range selected from the group consisting of: 0.2 mm to 10 mm; 0.4 mm to 8 mm; 0.8 mm to 5 mm; 1 mm to 5 mm; and 2 mm to 4 mm.

In other embodiments, the nozzle may be selected from the group consisting of: a whirlwind chamber cone spray nozzle; a solid cone spray nozzle; an oval-orifice spray nozzle; a deflector spray nozzle; an impinging jet spray nozzle; a bypass spray nozzle; a poppet spray nozzle; a two fluid spray nozzle; and a vaned rotating wheel spray nozzle.

The liquid atomised by the liquid atomisation units may be liquid water. In other embodiments, the liquid may be an alcohol such as methanol or ethanol or a combination of an alcohol and water. In yet another embodiment, the liquid may be ammonia.

The liquid within the liquid atomisation unit may be cooled as the adsorbate vapor is formed. The cooled liquid may be used as a refrigerant. The temperature of the produced coolant may be at temperature in the range selected from the group consisting of: about 5° C. to about 25° C.; 5° C. to about 20° C.; 6° C. to about 15° C.; and 7° C. to about 11° C.

The adsorbent material may comprise a bed of desiccant material such as silica gel or zeolite.

In the desorption mode, the desiccant material may be heated with a heated fluid. The heated fluid may be at a temperature in the range selected from the group consisting of: 70° C. to 250° C.; 75° C. to 200° C.; 75° C. to 150° C.; 75° C. to 100° C.; 75° C. to 90° C.; and 75° C. to 85° C. In one embodiment, the adsorbent material is silica gel and heated fluid may be at a temperature in the range of about 70° C. to about 100° C. In another embodiment, the adsorbent material is zeolite and heated fluid may be at a temperature in the range of about 150° C. to about 250° C. Advantageously, the heated fluid may be heated by a source of waste heat.

In the adsorption mode, the desiccant material may be cooled with a coolant fluid. The coolant fluid may be at a temperature in the range selected from the group consisting of: 20° C. to 40° C.; 25° C. to 35° C.; 28° C. to 34° C.; and 28° C. to 33° C. In one embodiment, coolant fluid may be at a temperature in the range of about 29° C. to about 32° C.

BRIEF DESCRIPTION OF DRAWINGS

A non-limiting embodiment of the invention, will be described with reference to the accompanying drawings in which:

FIG. 5 is a perspective view of the liquid atomisation unit of FIG. 4;

FIG. 6 is a cross-sectional front view of the liquid atomisation unit of FIG. 5;

FIG. 7 is a cross-sectional rear view of the liquid atomisation unit of FIG. 5;

FIG. 8 is a top view of the liquid atomisation unit of FIG. 5;

FIG. 9 is a bottom view of the liquid atomisation unit of FIG. 5;

FIG. 10 is a cross-sectional side view of the liquid atomisation unit of FIG. 5 in operation;

DETAILED DESCRIPTION OF DISCLOSED EMBODIMENT

Figure 1:
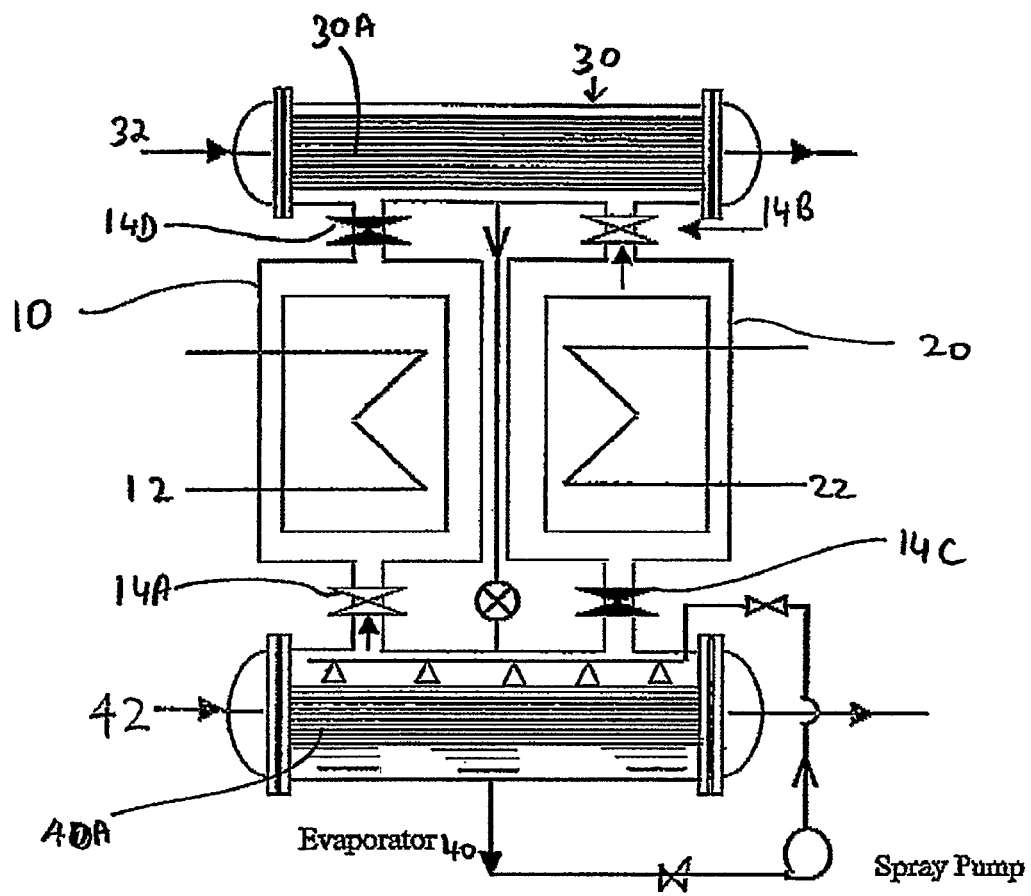
FIG. 1 is a schematic view of a known adsorption chiller as described in the background section of the specification.
Figure 2:
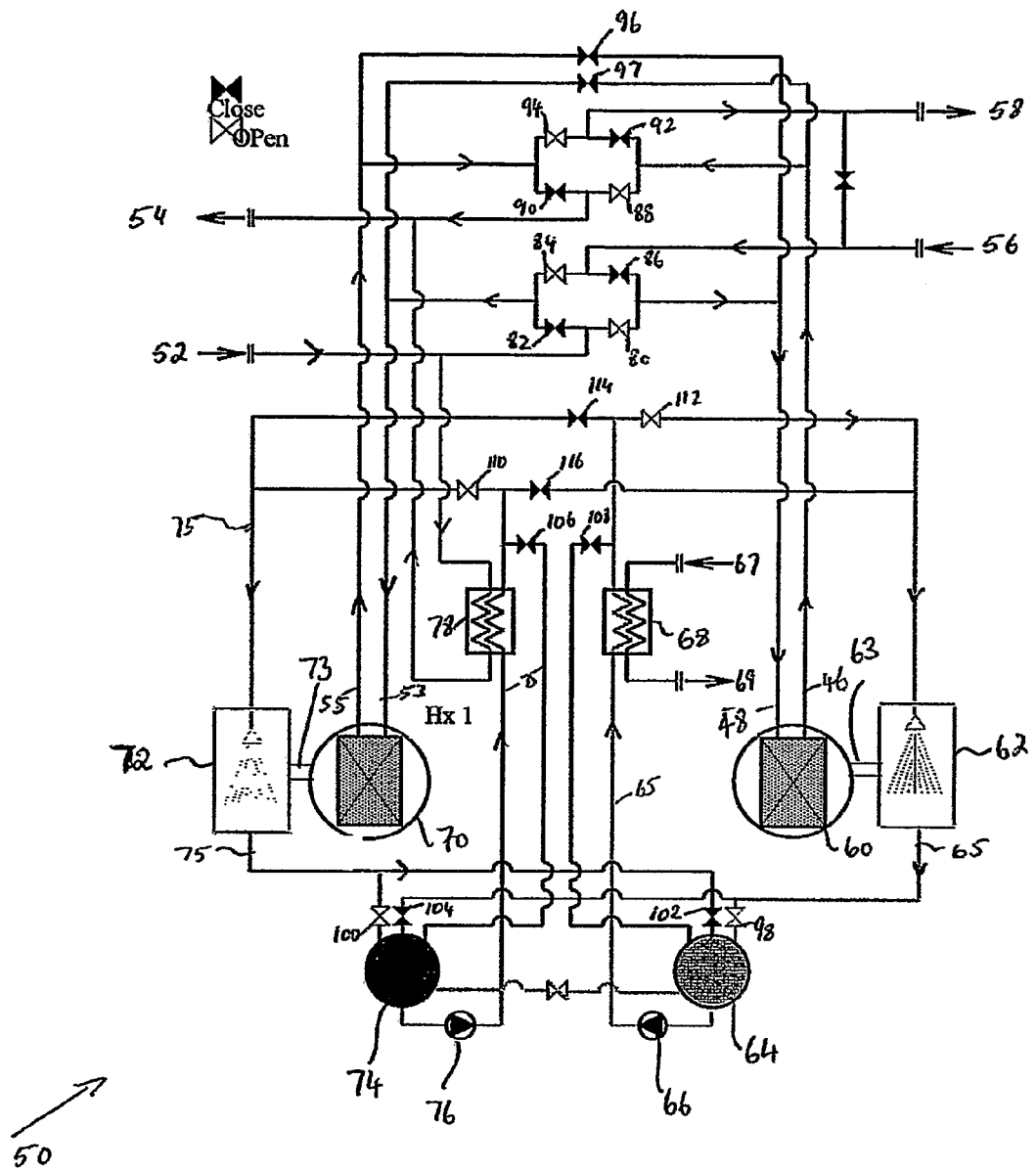
FIG. 2 is a simplified process flow diagram of a regenerative adsorption chilling system in operation.

Referring to FIG. 2 there is shown a simplified process flow diagram of a regenerative adsorption system in the form of adsorption water chilling system 50. The system 50 includes two liquid atomisation units (60,70) that in operation atomise a liquid to form an adsorbate vapor or to condense desorbed vapor.

The system 50 also includes two reactors in the form of heat exchange reactors (60,70) that are both capable of operating in an adsorption mode and in a desorption mode. The reactors (60,70) include a chamber that is provided with heat exchange tubing (not shown). The chambers of the reactors (60,70) each comprise adsorbent material in the form of a packed bed of a high capacity desiccant material which is disposed between the heat exchange tubing of the reactor. The desiccant material may be calcium oxide or silica gel and may be granulated or beaded. In this particular disclosed embodiment, the adsorbent material is RD 2560 silica gel available from Fuji Silysia Chemical Ltd of Japan. Other exemplary silica gels available commercially are: MYCOM™ silica gel produced by Mayekawa Mfg. Co., Ltd; and Sorb-It™ silica gel from AGM Container Controls, Inc. of Tucson, Ariz., United States of America™. Other commercial suppliers of silica gel are Sphinx Adsorbents, Inc., of Springfield, Mass., United States of America and W. R. Grace & Co. of Columbia, Md., United States of America.

In this embodiment, the reactors (60,70) are commercially available from the present Cyclect Electrical Engineering Pte Ltd., of Singapore. Other exemplary adsorption reactors that may be used include an NAK™ adsorption chiller available from or an ADR 30™ from Mayekawa MFG., Co., Ltd of Japan.

In the adsorption mode, the reactors 60,70 are able to absorb the adsorbate water vapor that has been generated by the liquid atomisation units (62,72).

In operation, the disclosed system 50 operates in four consecutive cycle modes as shown in Table 1 below.

TABLE 1

| Cycle | Reactor 70 mode | Reactor 60 mode |
| --- | --- | --- |
| Cycle A | Desorption | Adsorption |
| Cycle B | Heat switching cycle | Heat switching cycle |
| Cycle C | Adsorption | Desorption |
| Cycle D | Heat switching cycle | Heat switching cycle |

FIG. 2 shows the system operating in Cycle A in which the reactor 60 operates in an adsorption mode in which vapor is adsorbed onto the surface of the silica gel while the reactor 70 operates in a desorption mode in which heat is applied to the silica gel bed to drive off water from the silica gel (ie desorbed vapor).

The system 50 also includes an inlet conduit 52 that provides cooling water to either of the reactors (60,70) when operating in the adsorption mode. The outlet of the cooling water is shown by cooling water conduit 54. The system 50 also includes a hot water cooling conduit shown by the heated water conduit 56 that supplies hot water to either of the reactors 60,70 when operating in the desorption mode, and from which heated water is removed via heated water outlet conduit 58.

The system 50 also includes two plate heat exchanges in the form of plate heat exchanges 68 and 78 which are respectively associated with the reactors (60,70). In this embodiment, the plate heat exchangers are obtained from Alfa Laval Singapore Pte Ltd of Singapore.

The heat exchanger 68 is thermally coupled to a chilling water inlet conduit 67 and a chilling water outlet conduit 69. The water in the chilling water outlet conduit is water that has been chilled during adsorption and which is used as a refrigerant, as will be explained further below.

The system 50 also includes evaporated water receiver 64 and condensed water receiver 74 for respectively receiving water from the outflow of the atomisation units 62 and 72 during cycle A. A pair of re-circulation pumps (66,76) are also respectively operatively associated with each of the reactors (60,70) as will be described further bellow.

The system 50 also includes a set of valves (80, 82, 84, 86, 88, 90, 92, 94, 96, 97, 98, 100, 102, 104, 106, 108, 112, 114). It should be noted that the valves shown in FIG. 2 having a dark fill color are closed while the valves having a white fill color are open.

The system 50 is operated by a control system (not shown to open and closed the valves of the system 50. One exemplary control system is commercially available from Cyclect Electrical Engineering Pte Ltd., of Singapore. Other exemplary commercially available control system that could be used to operate the system 50 may be the TDC 3000™ from Honeywell International Inc. of Morristown, N.J., United States of America.

In cycle A, the reactor 60 adsorbs water vapor that has been generated by the liquid atomisation unit 62. The liquid atomisation unit 62 includes a series of atomising devices that each eject a spray of liquid water into a chamber, as will be described further below. Atomised water evaporates in the chamber to form a water vapor that is capable of being adsorbed by the silica gel within the reactor 60 ("adsorbate water vapor"). The latent heat of evaporation causes the fluid (water vapor and liquid water dispersed within the chamber) to cool down. Cooled water collects in the bottom of the liquid atomisation unit 62.

The reactor 60 is in direct fluid communication with the liquid atomisation unit 62 to allow the adsorbate water vapor to travel from the outlet of the liquid atomisation unit 62 to the reactor 60 via conduit pipe 63. Advantageously, there is no liquid vaporization valve between the liquid atomisation unit 62 and the reactor 60, which significantly saves on capital and maintenance costs. Additionally, the liquid atomisation unit 62 and the reactor 60 are operating under vacuum. Furthermore, the liquid atomisation unit 62 is at a vacuum of 5.33 kPa (40 torr) while the reactor 60 is in the adsorption mode and the liquid atomisation unit 72 is at a vacuum of 0.933 kPa (7 torr) while the reactor 70 is in the desorption mode.

The adsorbate water vapor produced by the liquid atomisation unit 62 travels to the reactor 60 where it is adsorbed onto the surface of the silica gel within the reactor 60. The adsorption of the water vapor onto the surface of the silica gel is exothermic. To maintain the temperature within the reactor 60, cooling water from cooling water inlet conduit 52 passes via open valve 80 and through to the heat exchange tubing (not shown) that passes through the chamber of the reactor 60.

Once the cooling water has passed through the reactor 60 and removed heat generated during adsorption of the adsorbate water vapor onto the silica gel, the cooling water passes through cooling water outlet conduit 54 via open valve 88 while valves 82 and 86 are closed in this configuration.

The cooling water inlet conduit 52 and outlet conduit 54 in this embodiment are in communication with a cooling water tower. However in other embodiments, the water inlet conduit 52 and outlet conduit 54 may be in heat exchange with another form of heat exchanger or the inlet conduit 52 could be connected to a cooling water source while the outlet conduit 54 passes the water to a water reservoir.

As the reactor 60 adsorbs adsorbate water vapor generated by the liquid atomisation unit 62 during its adsorption cycle, additional adsorbate water vapor generated by the liquid atomisation unit 62 transfers to the reactor 60. It will be appreciated that the transfer of the adsorbate water vapor onto the silica gel from the liquid atomisation unit is equilibrium driven.

The liquid within the liquid atomisation unit 62 cools and is chilled as the atomised water evaporates. The atomised adsorbate vapor that has not been driven onto the reactor 60 is cooled and collects in the bottom of the liquid atomisation unit 62 as cooled liquid water. The cooled liquid water passes via re-circulation conduit 65 to evaporated water receiver 64 as valve 98 is open while valve 104 is closed.

The evaporated water receiver 64 stores a body of the cooled water which is then transferred via recirculation pump 66 to the plate heat exchanger 68. The cooled water exchanges heat with water that enters via chilling water inlet conduit 67 to chilling water outlet conduit 69 so that the water being emitted from chilling water outlet 69 becomes chilled and transfers its heat to the chilled water that is in recirculation conduit 65.

The water emitted from chilling water outlet conduit 69 can be used as a refrigerant in a cooling system. Examples of cooling systems that may utilise the water refrigerant emitted through outlet conduit 69 includes air conditioning systems, refrigeration systems or any process that requires a cooling medium.

The water passing from re-circulation conduit 65 that has exchanged heat with the heat exchanger 68 then travels via open valve 112 while valve 114 is closed to return to the liquid atomisation unit 62 where the liquid is again atomised.

During Cycle A, while the reactor 60 operates in the adsorption mode, the reactor 70 operates in the desorption mode. The reactor 70 contains the same silica gel as the reactor 60, only in the desorption cycle, the silica gel has been fully charged with the adsorbate water from a previous adsorption cycle. In the desorption mode, the reactor 70 operates in reverse to reactor 60 by desorbing water from the silica gel upon the application of heat to the silica gel bed. The silica gel releases water vapor ("desorbed water vapor").

Heat applied to the silica gel in this embodiment is from heated water that enters the reactor 70 via heated water inlet 56. The heated water within heated water inlet 56 is advantageously heated from a waste heat source. The waste heat source may be provided by a waste heat process such as a gas turbine. In the present disclosed embodiment, the gas turbine that provides a source of waste heat is a MICROTURBINE™ power turbine manufactured by Capstone Turbine Corporation of Chatsworth, Calif., United States of America, which is advantageously relatively compact and which produces relatively low exhaust emissions. It should be realised that in other embodiments, other commercially available turbines may be used or waste heat from other heat producing devices such as boilers, or furnaces may used as a waste heat source. In an alternative embodiment, the heat source providing heated water through conduit 56 may be a solar power source in which the hot water is heated in solar collectors exposed to solar energy.

The heated water passes through hot water inlet conduit 56 via valve 84 while valves 86 and 82 are closed. The hot water enters the water conduit 53 and passes through the heat exchange tubes provided within the reactor 70 (not shown). The heated water heats the silica gel and drives off water as water vapor ("desorbed water vapor") which passes to the liquid atomisation unit 72 via conduit 73.

The heated water passing through the heat exchange tubes within in the reactor 70 pass out via conduit 55 and out through open valve 94 while valves 92 and 90 are closed. The heated water then exits from hot water outlet conduit 58 where it returns to the waste heat source for re-heating and subsequent re-cycling through the reactor 70.

The desorbed water vapor that has passed from conduit 73 through to liquid atomisation unit 72 is then condensed as it makes contact with atomised liquid within the liquid atomisation unit 72. The condensed liquid water is heated and accumulates in the bottom of the liquid atomisation unit 72 before passing via conduit 75 through to condenser receiver 74 while valve 100 is open and valve 102 closed.

The condenser receiver 74 is a store of the heated condensed liquid water, which is transferred via recirculation pump 76 to the plate heat exchanger 78, which cools the heated condensed liquid water upon heat exchange with cooling water provided by the cooling water inlet conduit 52. The cooling water within heat exchanger 78 enters via water cooling inlet conduit 52, via open valve 80.

The condensed water that has been cooled by the heat exchanger 78 returns to the liquid atomisation unit 72 via re-circulation conduit 75 with valve 110 open.

Figure 3:
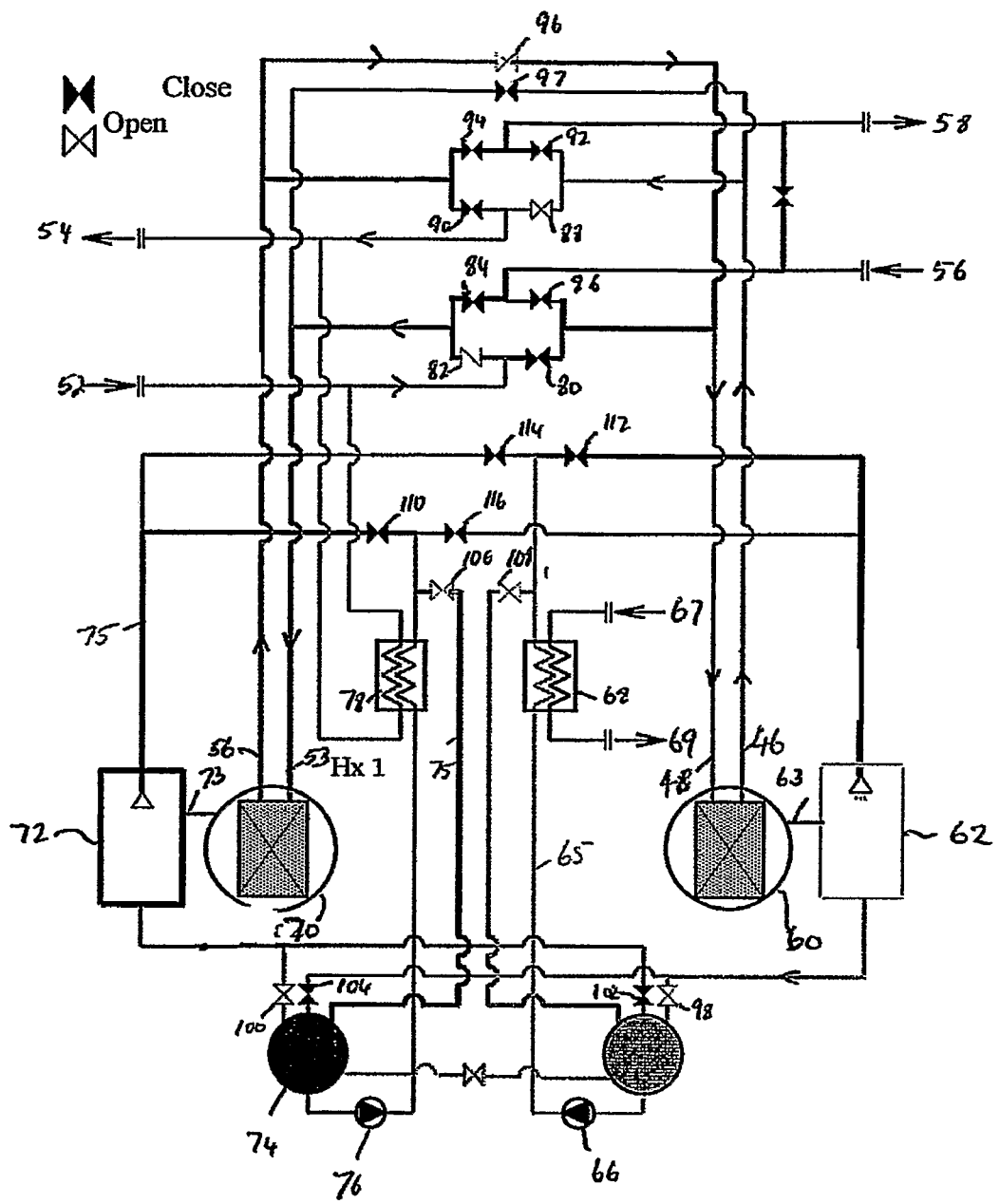
FIG. 3 is the regenerative adsorption chilling system of FIG. 2 in the heat recovery cycle.

At the end of Cycle A, system 50 reverts to Cycle B, which is a switching cycle mode in which valves 80 to 114 are opened and closed as shown by the valve arrangement of FIG. 3. In the switching Cycle B of FIG. 3, stored heat from the desorption mode of reactor 70 is transferred to the reactor 60 by pushing the cooling water from reactor 60 as it gradually enters the desorption mode. The atomisation devices of the liquid atomisation units (62,72) are bypassed and the water allowed to drain off to the to the respective receivers (64,74).

In the switching Cycle B mode, cooling water from the inlet 52 passes via open valve 82 while valves 80, 84 and 86 are closed and enters the reactor 70 via conduit 53. The cooling water continues to pass through the heat exchange tubes of the reactor 70 outputs via outlet conduit 56. The cooling water in outlet conduit 56 passes to conduit 48 via a valve open 96 and pushes heated water away from the reactor 70. The heated water passes through conduit 54 through via valve 88 while valves 90, 92 and 94 closed. The heated water passes out through cooling water outlet valve 96 to flush cold water from lines (46,48) and the heat exchange tubes of reactor 60. In this embodiment, the switching cycle mode occurs for about 45 to 60 seconds.

At the end of the switching cycle mode the system reverts to Cycle C in which reactor 60 operates in the desorption mode while reactor A operates in the adsorption mode by altering valves (80, 82, 84, 86, 88, 90, 92, 94, 96, 97, 98, 100, 102, 104, 106, 108, 112, 114). Accordingly, during Cycle C, heated water from inlet 56 passes via open valve 86 while valves 84 and 82 are closed along conduit 48 to reactor 60.

In Cycle C, heated water passing through the reactor 60 drives off the adsorbed water from the surface of the silica gel as desorbed water vapor. The desorbed water vapor is then condensed in the atomisation unit 62. The valve 98 is closed while valve 104 is open to allow the condensed water to report to the condenser receiver 74.

During Cycle C, cooling water from inlet conduit 52 enters conduit 53 via open valve 82 while valves 80 and 84 are closed. After passing through the heat exchanger tubes of reactor 70, the cooling water exits the reactor 70 via conduit 56 and flows out through the outlet conduit 54 via open valve 90 while valve 94 and 88 are closed. Accordingly, the reactor 70 operates in the adsorption mode and the liquid atomisation unit 72 generates water adsorbate vapor that is adsorbed by the reactor 70. The water that is not adsorbed by the reactor 70 condenses and becomes cooled in the liquid atomisation unit 72 from which the water exits conduit 75. Valve 100 is closed and valve 102 is open so that the cooled water reports to the evaporated water receiver 64.

At the end of Cycle C, the system progresses into Cycle D, which is a repeat of Cycle B except that heat is flushed with cold water from the reactor 60 over to reactor 70. The system then reverts back to Cycle A, whereby the progression of Cycles A t D are repeated. Accordingly, it will be appreciated that the system 50 is a regenerative adsorption system. Advantageously, in this embodiment, the operation of the two reactors (60,70) enables a relatively constant supply of coolant refrigerant. It should be realised that system could be implemented for a single reactor so that the supply of coolant is supplied in batch mode. Alternatively, the liquid atomisation units could be implemented in multiple regenerative adsorption reactors as disclosed in U.S. Pat. No. 6,490,875.

Figure 4:
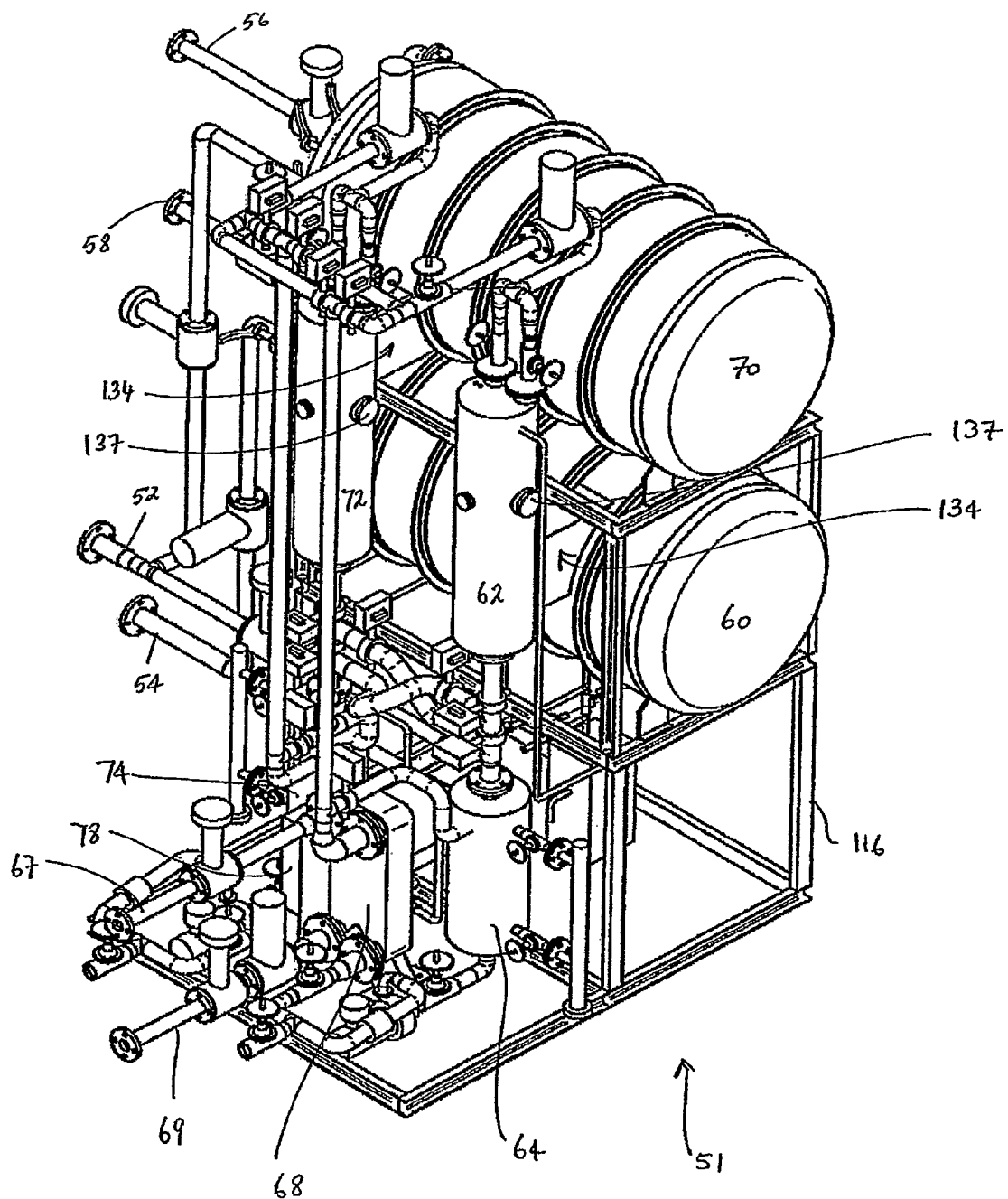
FIG. 4 is a perspective view of the apparatus of the adsorption chilling system of FIG. 1.

Referring to FIG. 4 there is shown a perspective view a plant 51 having the equipment of the system 50 as described above. As it can be seen from FIG. 4, the plant 51 includes a support frame 116 for supporting the reactors (60,70) which are respectively associated with liquid atomisation units (62, 72). The plant 51 also includes cooling water inlet conduit 52 and cooling water outlet conduit 54, hot water inlet conduit 56 and hot water outlet conduit 58. The plate heat exchanges 78 and 68 are also shown, as are receivers 64 and 74. The valves 82, 84 are also shown.

Referring to FIGS. 5 to 9, the liquid atomisation unit 62 will be described in further detail. It should be realised that the following description of the liquid atomisation unit 62 also applies to liquid atomisation unit 72.

Referring to FIG. 5 there is shown a perspective front view of the liquid atomisation unit 62 in the form of a cylindrical vessel 118. The cylindrical vessel 118 has a chamber 124, as shown by the cross-sectional front view of the liquid atomisation unit shown in FIG. 6, which shows the cross sectional front view of the vessel in a plane along arrows AB.

The vessel 118 includes two inlet flanges 120, 122 which provide a connection for water inflow from re-circulation conduit 65 to the vessel 118. The vessel 118 also includes a vapor conduit duct 134 which allows the direct transfer of vapor between the vessel 118 and the reactor 60. The vapor conduit duct 134 is shown in FIG. 6 and FIG. 7 by dashed lines 134. The vessel 118 also includes view window 137 for allowing an operator of the liquid atomisation unit 60 to see inside the liquid atomisation unit.

It will be appreciated that in other embodiments, the liquid atomisation unit may not be in the form of a vessel but may disposed within the chamber of the reactor.

Referring again to FIG. 4, it can be seen that the vapor conduit duct 134 is shown connected to the reactor 60.

Referring now to FIGS. 5-10, the chamber 124 includes two atomisation devices in the form of spray heads (126, 128) which include a plurality of flat head sprays (130) provided on the surface of the spray heads (126,128). The spray heads (126,128) are hollow pipes that are respectively connected at one end to the flanges (120,122) and a plug at the opposite end to prevent fluid flow.

In this embodiment, the spray heads have a number of orifices having a diameter of 5.2 mm to emit a spray within the chamber 124. This allows water adsorbate vapor to be emitted from conduit duct 134 to the reactor 60 when operating in the adsorption mode or for desorbed vapor that is generated by the reactor 60 operating in the desorption mode to be condensed within the chamber 124.

As described above, water collects in the bottom part of the chamber 124 and exits via outlet flange 132, which provides a connection to either the evaporated water receiver 64 or the condensed water receiver 74 as described above.

Advantageously, waste heat in the range 70-95° C. emitted by a turbine can be used as a waste heat source to drive the regenerative adsorption system for producing cooling water refrigerant at a temperature of 7° C.

Exemplary dimensions of the plant 51 are also provided in Table 2 below to further illustrate the disclosed embodiment.

TABLE 2

| Weight | Shipment | kg | 1800 |
|---|---|---|---|
| Dimensions | W | mm | 2000 |
|  | H | mm | 2500 |
|  | L | mm | 2000 |

It can be seen from Table 2, that the disclosed plant 51 is relatively light in weight compared to known industrial scale chilling systems and takes up about 10 m$^3$ in space. This advantageously allows the plant 51 to be transportable, making the plant 51 suitable for servicing small scale refrigerant requirements. However, in other embodiments the plant 51 may be scaled up in size to produce more cooling water refrigerant.

Figure 11:
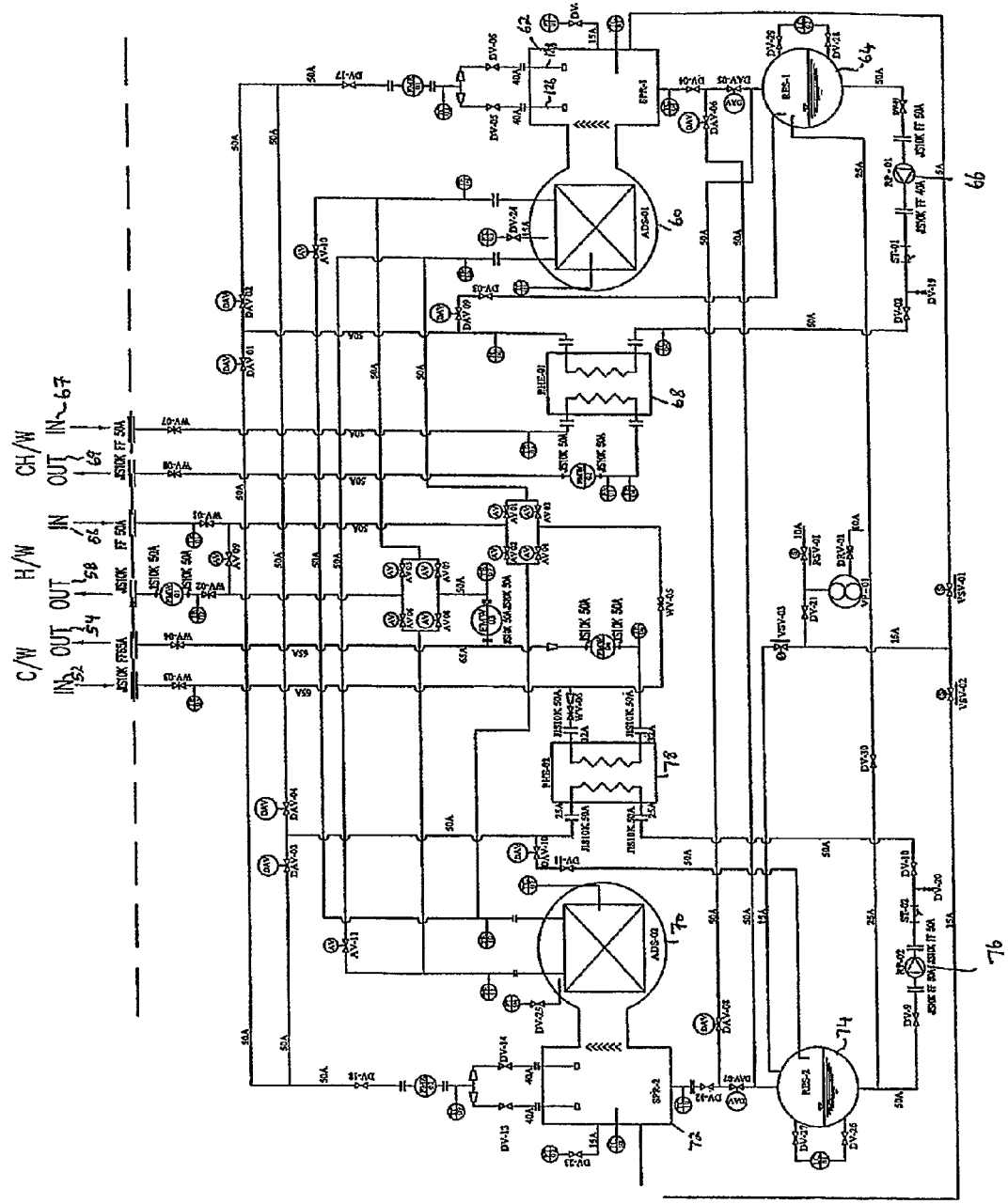
FIG. 11 shows a more detailed control diagram of the regenerative adsorption system of FIG. 1.

FIG. 11 is to be interpreted with the data disclosed in Appendix A. Appendix A is incorporated within this description in its entirety and forms part of the disclosure of the disclosed embodiment.

FIG. 11 shows a more detailed process control diagram of the regenerative adsorption system 50, showing additional unit operations such as sensors, flow meters and valve types. Table A1 attached in Appendix A tabulates a "tag no." identifier, the device name and quantity of each of the units of operations shown in FIG. 11.

Appendix B is incorporated within this description in its entirety and forms part of the disclosed embodiment. Appendix B details the parameters and results of a simulation of the system 50 that was performed using a distributed-parameter model. The detailed model is disclosed in H T Chua, W Wang, C Yap & X L Wang, "Transient Modeling of a Two-bed Silica Gel Adsorption Chiller", International Journal of Heat and Mass Transfer (2003) (Accepted for publication). In the simulation, it was assumed that the chilled-water plate heat exchanger (68), atomisation units (62,72), receivers (64,74) and associated conduits well-insulated evaporator. It was also assumed that the chilled water tubes of the evaporative receiver were considered to be immersed in the refrigerant so that the refrigerant evaporates on the tube surface and cools the chilled water inside the tube. This is assumption is actually different from the present design consideration where refrigerant first evaporates in the atomisation unit and then cools the chilled water through the heat exchanger (68). However, the effect on the simulation results is small if the liquid atomisation chamber and evaporated water receiver (64) are well insulated and the energy exchange only happens between the chilled water and the refrigerant. The same assumption is applied to the condensed water receiver (74) as the effect on the simulation results is also small. The energy imbalance between the sum of cooling capacity and desorber reactor heat input as well as the sum of condensed water receiver (74) and adsorber heat rejections is about 1-2%.

Figure 12:
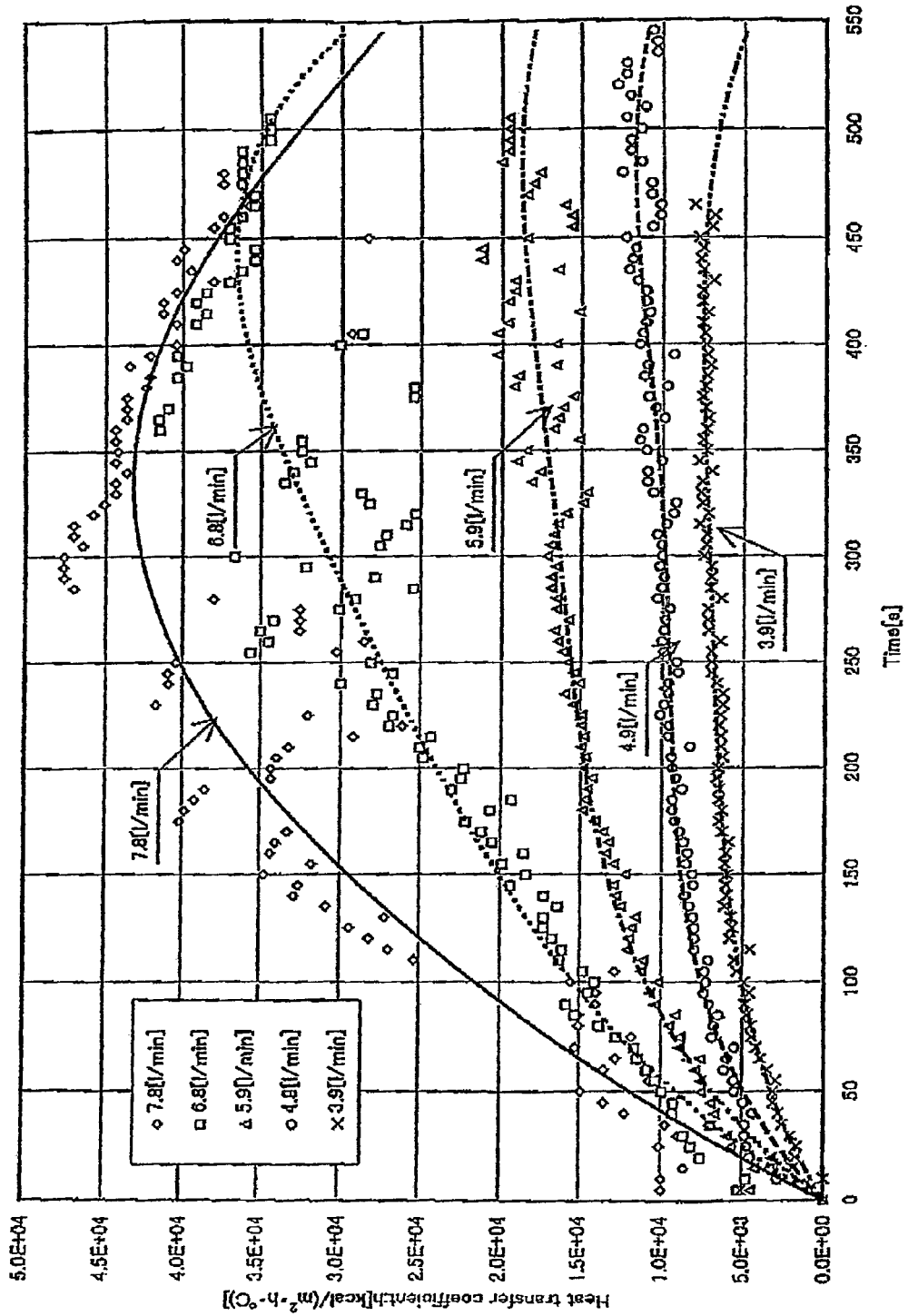
FIG. 12 is a graph showing the average heat transfer coefficient at various flow rates of the liquid atomisation units in the desorption cycle over a period of time.
Figure 12A:
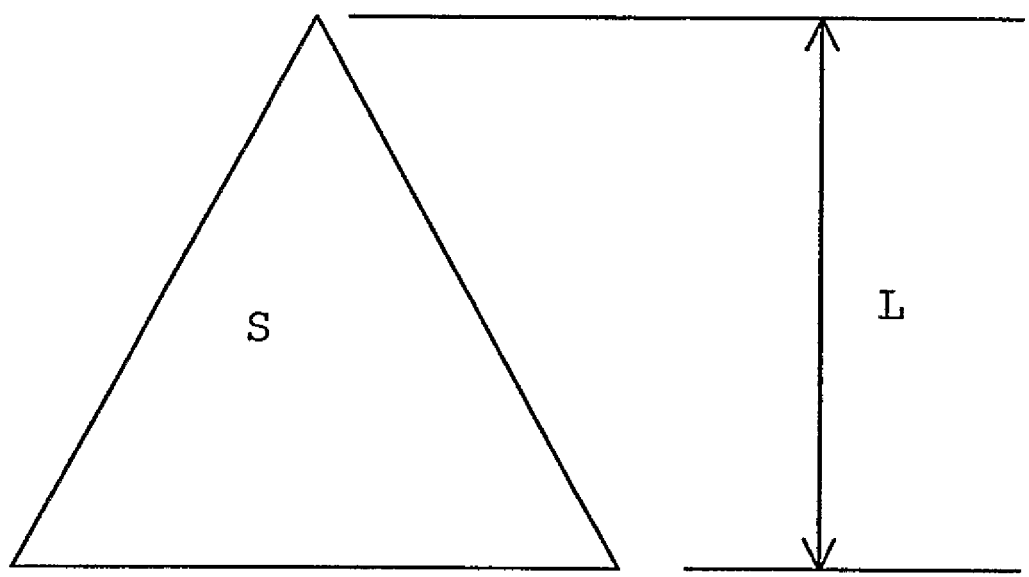
FIG. 12A is a schematic diagram showing the area (S) of a spray ejected from a nozzle head and the associated length (L) of the spray ejected from the nozzle head.

Referring to FIG. 12, there is shown a graph showing the average heat transfer coefficient at various flow rates versus the length (L) of the spray ejected from the nozzle heads (126, 128) in the desorption cycle of the system 50. The length (L) of the spray ejected from the nozzle heads is shown schematically in FIG. 12A, where S shows the area covered as the spray is ejected from a nozzle head. The water inlet temperature of the conduit 52 was 21° C., while length (L) of the nozzle heads was 0.166 m. It can be seen that at a flow rate of 3.9 l/min, and 4.9 l/min and 5.9 l/min, the average heat transfer co-efficient was relatively constant over time, indicating that the system 50 achieved thermal equilibrium over time. It can be seen that at a higher flow rate of 6.8 l/min, the average heat transfer co-efficient peaked from about 250 seconds to about 400 seconds while at a flow rate of 7.8 l/min, the average heat transfer co-efficient peaked from about 350 seconds to about 500 seconds. It can also be seen from FIG. 12 that the average heat transfer coefficient increases with increasing flow rate.

Figure 13:
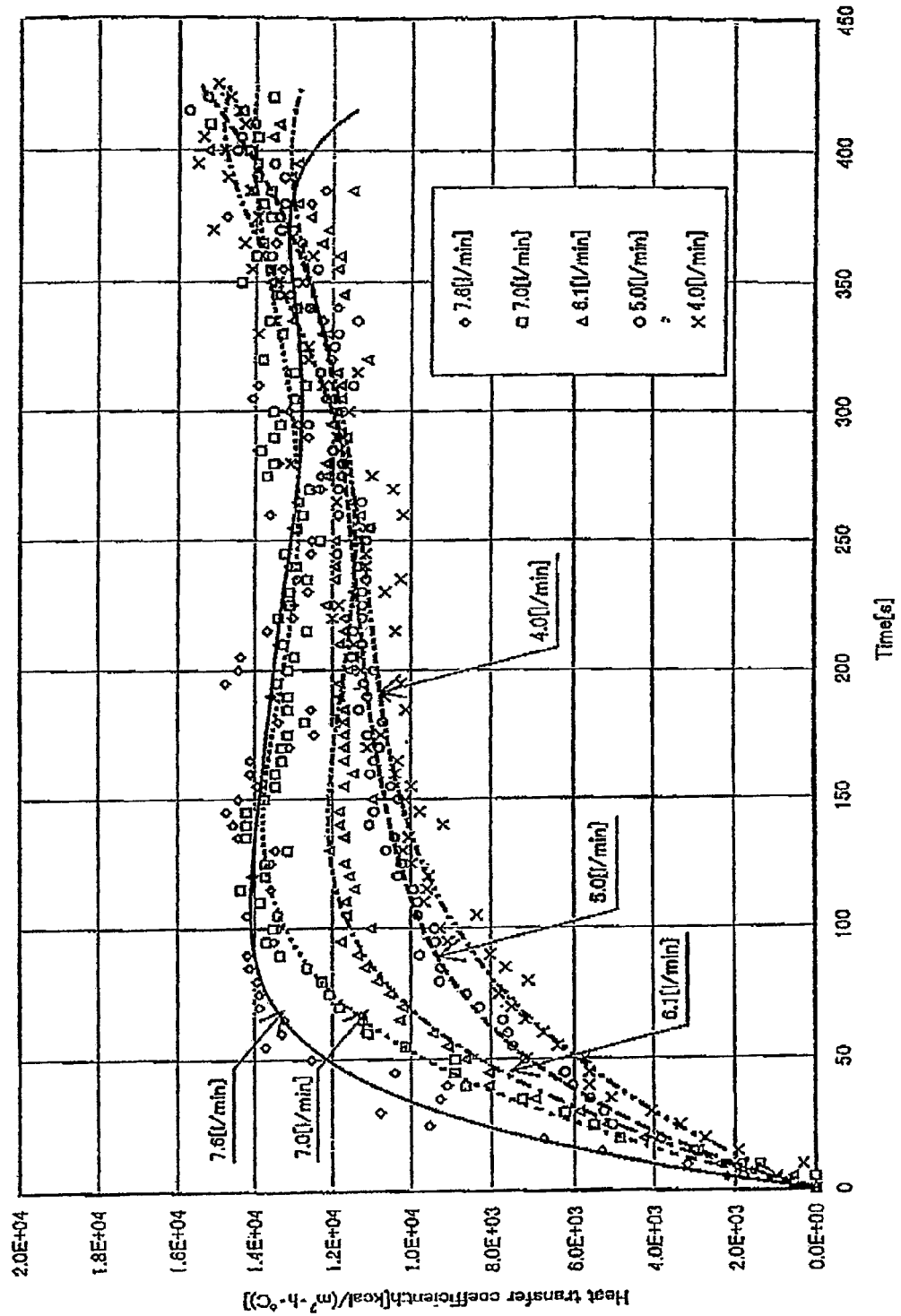
FIG. 13 is a graph showing the average heat transfer coefficient at various flow rates of the liquid atomisation units in the adsorption cycle over a period of time.

FIG. 13 is a graph showing the average heat transfer coefficient at various flow rates versus the length (L) of the spray ejected from the nozzle heads (126, 128) in the adsorption cycle that has been derived from experimental data of the system 50. The water inlet temperature of the conduit 52 was 17° C., while length (L) of the nozzle heads was 0.166 m. It can be seen that the average heat transfer coefficient increases with increasing flow rate. It can also be seen that at flow rates of 7.0 l/min and 7.6 l/min, the average heat transfer co-efficient achieved its maximum in less time than at the lower flow rates of 4.0 l/min and 5.0 l/min.

Referring to FIGS. 12 and 13, it can be seen that very large heat transfer co-efficient can be achieved. For example, the maximum heat transfer co-efficient at a flow rate of 7.8 l/min in the adsorption cycle was in the range of about 35,000 kcal/m2·h·° C. to about 47,500 kcal/m2·h·° C. (about 146,440 kJ/m2·h·° C. to about 198,740 kJ/m2·h·° C.) in the desorption cycle. The heat transfer co-efficients are relatively lower in the adsorption cycle but are relatively higher compared to known systems, being about 14000 kcal/m2·h·° C. (58,576 kcal/m2·h·° C.) at 7.6 l/min. It will be appreciated from the data disclosed in FIGS. 12-13 that high heat transfer co-efficients can be achieved over, thereby achieving a highly efficient heat transfer system that increases the capacity of regenerative adsorption systems. Accordingly, it is possible to reduce the size of the reactions (60,70) per unit capacity if required. The higher heat transfer co-efficient accordingly can be achieved without the use of vapor valves or copper fin tubes.

The simulation of the system 50 can be characterized by the coefficient of performance (COP) according to the following equations:

Cooling power $$Q_{evap} = \frac{dM_{chilled}}{dt}[C_{pf}(T_{chilled}^{in})]\int_0^1 (T_{chilled}^{in} - T_{chilled}^{out})d\left(\frac{t}{t_{cycle}}\right)$$

COP $$COP = \frac{Q_{evap}}{\frac{dM_{heating}}{dt}[C_{pf}(T_{heating}^{in})]\int_0^1 (T_{heating}^{in} - T_{heating}^{out})d\left(\frac{t}{t_{cycle}}\right) + W_{pump}}.$$

The simulation results show that for a cooling capacity of 34 kW and a heat input of 62.4 kW, a COP of 0.53 can be achieved, which is relatively high.

The values for the parameters used in the analysis of the simulation to predict the performance of adsorption chilling system 50 are tabulated in Table B1 of Appendix B.

Figure 14:
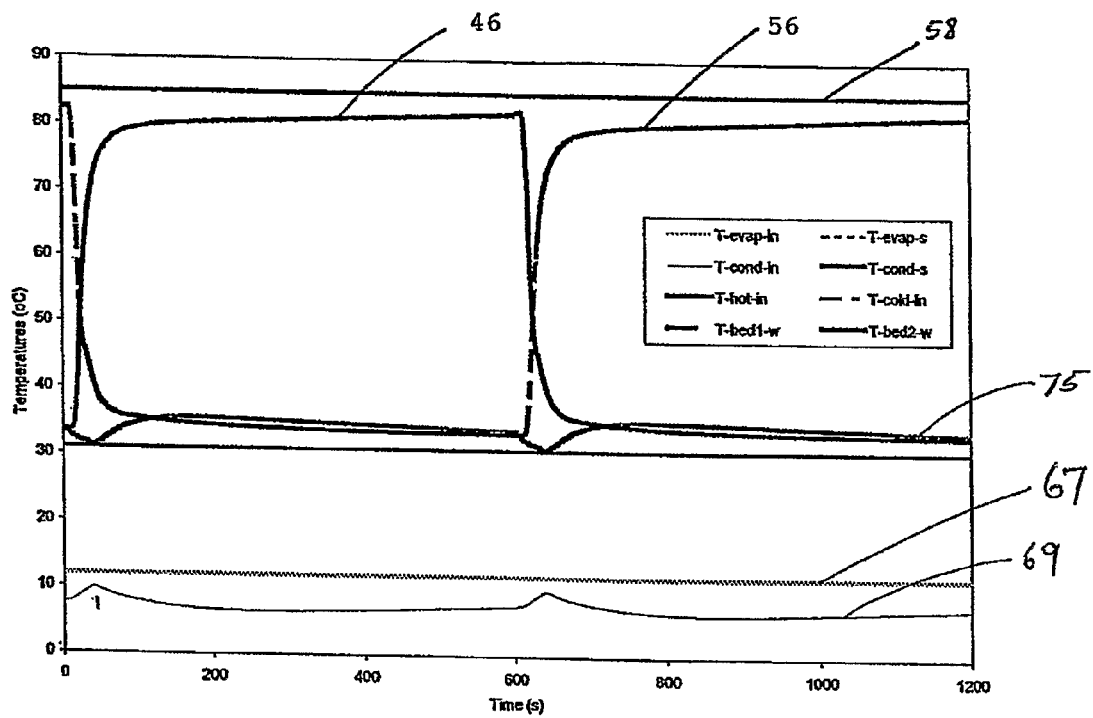
FIG. 14 shows temperature profiles of the outlet water temperatures for a more detailed control diagram of the regenerative adsorption system of FIG. 1.

Referring to FIG. 14, there is shown temperature profiles of the outlet water temperatures for that were generated by the simulation for the reactor 60 operating in the adsorption mode (46), the reactor 70 operating in the desorption mode (56), the outlet of the liquid atomisation unit (72) that has condensed water reporting to conduit (75), the chilled water outlet (67) and the chilled water inlet and outlet (67,69).

Figure 15:
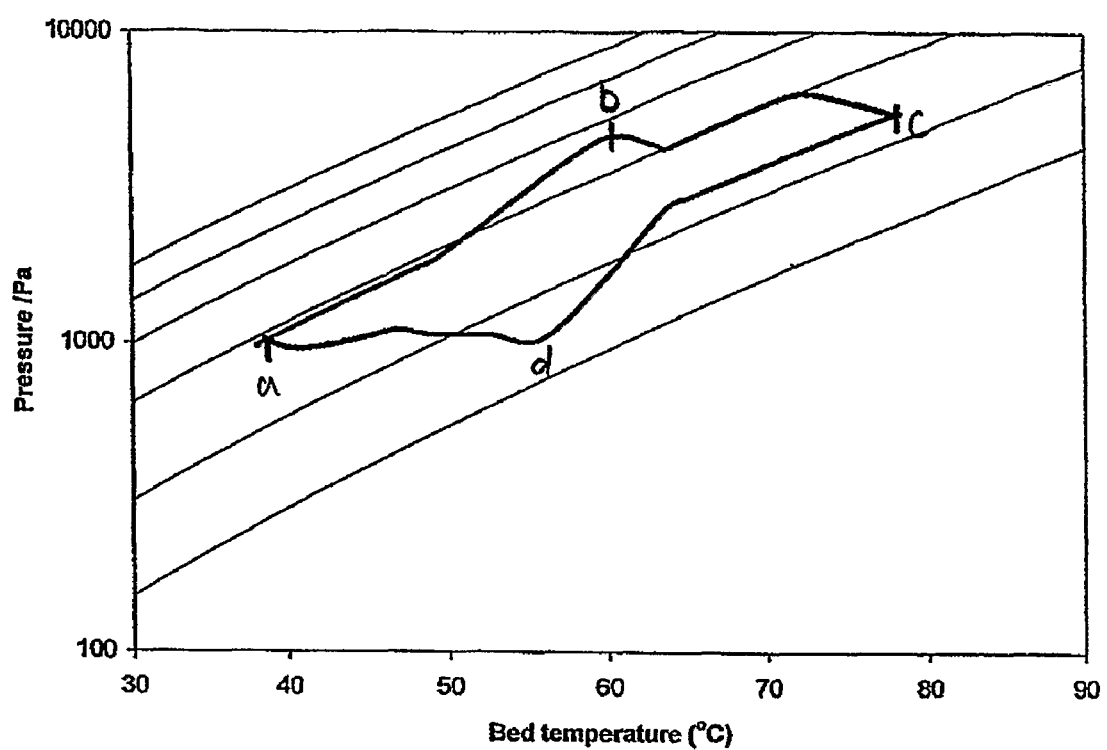
FIG. 15 shows a Duhring diagram of the cyclic steady state condition of the adsorption and desorption reactor beds.

FIG. 15 shows a Duhring diagram of the cyclic steady state condition of the adsorption and desorption reactor beds. The Duhring diagram shows the pressure and temperature relationship, which involves four processes: primary heat recovery, adsorption (evaporation), and secondary heat recovery and desorption (condensation). The desorption process is shown by b-c. The primary heat recovery process is shown by a-b. The adsorption process is shown by d-a. The secondary heat recovery process is shown by c-d.

During the primary heat recovery process (a-b), the reactor receives heat and the adsorbent temperature increases, which induces a pressure increase. During desorption (b-c), the reactor continues receiving heat while being in direct communication with the liquid atomisation unit, under condensing pressure. The adsorbent material temperature continues increasing, which induces desorption of desorbed vapour. This desorbed vapour is liquified by being condensed in the liquid atomisation unit to which the reactor is in direct communication.

During the secondary heat recovery process (c-d), the reactor releases heat and the adsorbent temperature decreases, which induces the pressure decrease. During adsorption, the reactor continues releasing heat while being connected to the liquid atomisation unit under evaporating pressure. The reactor temperature and the liquid atomisation unit to which it is directly connected, continues decreasing.

APPLICATIONS

It will be appreciated that the liquid atomisation units (62, 72) allow greater heat transfer for a reactor in an adsorption or desorption mode, thereby providing a highly efficient regenerative adsorption system that can be used as an adsorption chilling system. Furthermore, because the heat transfer efficiency is increased, a relatively smaller plant (51) can be implemented to produce chilled water refrigerant.

It will be appreciated that separate evaporators and condensers are not required as the liquid atomisation units are able to generate adsorbate water vapor and to condense desorbed water vapor, thereby reducing capital, operating and maintenance costs of the system.

A further advantage of using the liquid atomisation units is that vapor can be transferred directly to the reactors without using vapor valves, which are expensive and which induce a substantial pressure drop when converting liquid under pressure to a vapor.

A further advantage of using the liquid atomisation units is that it is not necessary to use copper shell and tubes for heat exchange, thereby reducing the overall cost of the regenerative adsorption system.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

TABLE A1

Appendix A

| TAG NO. | DEVICE NAME | QTY FEATURE NO. | Feature No. of FIG. 2 |
|---|---|---|---|
| RV-01 | PRESSURE REDUCED LEVEL | 1 | |
| PS-01 | PRESSURE SWITCH | 1 | |
| FS-01 | FLOWSWITCH | 1 | |
| LC-01,02 | LEVEL SENSOR | 2 | |
| TC-08 TO 12 | RTD | 5 | |
| TC-02 TO 07 | RTD | 5 | |
| TC-01,07 | RTD | 2 | |
| TE-02 TO 11 | RESISTTIVE THERMOMETER | 11 | |
| FMR-01 TO 02 | FLOW METER | 2 | |
| FMW-02,04 | FLOW METER | 2 | |
| FMW-01,03 | FLOW METER | 2 | |
| PT-01 TO 04 | PRESSURE TRANDUCER | 4 | |
| WV-01 TO 08 | GATE VALVE | 8 | |
| DRV-01 | VACCUM PUMP OIL DRAIN VALVE | 1 | |
| RSV-01 | SOLENOID RELIEF VALVE | 1 | |
| VSV-01 TO 03 | EXHAUST SOLENOID VALVE | 3 | |
| DAV-01 TO 10 | AIR ACTUATED BUTTERFLY VALVE | 10 | |
| AV-01 TO 11 | AIR ACTUATED BUTTERFLY VALVE | 11 | |
| DV-01 TO 30 | DIAPHRAGM VALVE FOR VACCUM LINE | 30 | |
| VP-01 | VACCUM PUMP | 1 | |
| PHE-02 | PLATE HX FOR COND. WATER | 1 | 78 |
| PHE-01 | PLATE HX FOR CHILLED WATER | 1 | 68 |
| ST-02 | STRAINER FOR COND. SPRAY PUMP | 1 | |
| ST-01 | STRAINER FOR EVAP. SPRAY PUMP | 1 | |
| RP-02 | CONDENSER SPRAY PUMP | 1 | 76 |
| RP-01 | EVAPORATOR SPRAY PUMP | 1 | 66 |
| SPR-2 | CONDENSER SPRAY CHAMBER | 1 | 72 |
| SPR-1 | EVAPORATOR SPRAY CHAMBER | 1 | 62 |
| RES-2 | CONDENSER RECEIVER | 1 | 74 |
| RES-1 | EVAPORATOR RECEIVER | 1 | 64 |
| ADS-2 | ADSORPTION HEAT EXCHANGER-2 | 1 | 70 |
| ADS-1 | ADSORPTION HEAT EXCHANGER-1 | 1 | 60 |

APPENDIX B

Nomenclature

| | |
|---|---|
| $C_{p,cond}$ | Specific heat capacity of condenser heat exchangeing material; J/kg K |
| $C_{p,evap}$ | Specific heat capacity of evaporator heat exchangeing material; J/kg K |
| $C_{p,Hex}$ | Mass weighted average specific heat capacity of heat exchanger tube-fin assembly; J/kg K |
| $C_{p,sg}$ | Specific heat capacity of silica-gel; J/kg K |
| $C_{pf}$ | Specific heat capacity of liquid refrigerant water; J/kg K |
| COP | Ratio of cycle averaged cooling capacity to power consumption of booster pump:- |
| $D_{S0}$ | Pre-exponent constant in the kinetic equation; m$^2$/s |
| $E_a$ | Activation energy of surface diffusion; J/mol |
| $h_{ad}$ | Partial enthalpy of adsorbate in adsorbent-adsorbate system; J/kg |
| $h_f$ | Specific enthalpy of liquid water; J/kg |
| $h_g$ | Specific enthalpy of gaseous water; J/kg |
| $M_{cond}$ | Mass of condenser heat exchanger tube; kg |
| $M_{evap}$ | Mass of evaporator heat exchanger tube; kg |
| $T_{cond}$ | Condenser temperature; °C. |
| $T_{evap}$ | Evaporator temperature; °C. |
| $T_K$ | Temperature of the Kth element of the bed heat exchanger (K = 1, . . . , $N_{bed}$); °C. |

APPENDIX B-continued

Nomenclature

| | |
|---|---|
| $U_{chilled}$ | Evaporator heat transfer coefficient; W/m² K |
| $U_{cond}$ | Condenser heat transfer coefficient; W/m² K |
| $U_{cooling}$ | Adsorber heat transfer coefficient; W/m² K |
| $U_{heating}$ | Desorber heat transfer coefficient; W/m² K |
| $V_{bed}$ | Internal volume of heat exchanger tubes in the bed; m³ |
| $V_{cond}$ | Internal volume of heat exchanger tubes in the condenser; m³ |
| $M_{Hex}$ | Mass of heat exchanger tube-fin assembly in bed; kg |
| $M_{ref,evap}$ | Liquid refrigerant mass in evaporator; kg |
| $M_{sg}$ | Silica-gel mass; kg |
| P | Pressure; Pa |
| $P_{cond}$ | Condenser pressure; Pa |
| $P_{evap}$ | Evaporator pressure; Pa |
| $P_{sat}$ | Saturate vapor pressure; Pa |
| q | Fraction of refrigerant adsorbed by the adsorbent; kg/kg of dry adsorbent |
| $q_0$ | Limit of adsorption by the adsorbent; kg/kg of dry adsorbent |
| E | Characteristics energy; J/mol K |
| n | Constant; — |
| q* | Fraction of refrigerant which can be adsorbed by the adsorbent under saturation condition; kg/kg of dry adsorbent |
| $Q_{evap}$ | Cycle averaged cooling capacity; W |
| R | Universal gas constant; J/mol K |
| $R_p$ | Average radius of silica-gel |
| t | Time; s |
| $t_{cycle}$ | Cycle time; s |
| T | Temperature; ° C. |
| $T_{bed,}$ | Bed temperature; ° C. |
| $V_{evap}$ | Internal volume of heat exchanger tubes in the evaporator; m³ |
| $dM_{chilled}/dt$ | Chilled water flow rate; kg/s |
| $dM_{cond}/dt$ | Condenser cooling water flow rate; kg/s |
| $dM_{cooling}/dt$ | Coolant flow rate through adsorber; kg/s |
| $dM_{heating}/dt$ | Heat source flow rate through desorber; kg/s |
| $\Delta H_{ads}$ | Isosteric heat of adsorption; J/kg |
| δ | Flag which governs desorber transients; - |
| $\rho_f$ | Density of liquid water; kg/m³ |

TABLE B1

| | | | |
|---|---|---|---|
| $D_{s0}$ | 2.54E−4 m²/s | $A_{evap}$ | 9.7 m² |
| $E_a$ | 4.2E4 J/mol | $A_{cond}$ | 4.0 m² |
| $R_p$ | 0.5E−3 m | $M_{sg}$ | 180 kg |
| $dM_{cooling}/dt$ | 3.5 kg/s | $C_{P,Hex}M_{Hex}$ | 175 kJ/K |
| $dM_{heating}/dt$ | 2.8 kg/s | $C_{P,evap}M_{evap}$ | 4.21 kJ/ |
| $dM_{chilled}/dt$ | 1.68 kg/s | $C_{P,cond}M_{cond}$ | 4.18 kJ/K |
| $dM_{cond}/dt$ | 2.8 kg/s | $C_{P,sg}M_{sg}$ | 166 kJ/K |
| $U_{cooling}$ | 1500 W/m²/K | $V_{bed}$ | 0.0332 m³ |
| $U_{heating}$ | 1000 W/m²/K | $V_{cond}$ | 0.37 m³ |
| $U_{chilled}$ | 3800 W/m²/K | $V_{evap}$ | 1.17 m³ |
| $U_{cond}$ | 4800 W/m²/K | $\Delta H_{ads}$ | 2710 kJ/kg |
| $A_{bed}$ | 13.3 m² | | |

The invention claimed is:

1. A regenerative adsorption system comprising:

a reactor containing adsorbent material, the reactor operating alternatively in an adsorption mode and a desorption mode; and an atomization unit containing a chamber, the atomization unit atomizing feed liquid into a vapor phase and a cooled liquid phase, the latent heat of evaporation of said vapor phase rendering said cooled liquid phase to have a lower temperature relative to said feed liquid, the chamber directly transmitting said vapor phase directly onto said adsorbent material without the use of liquid vapor valves while said cooled liquid collects in said atomization unit;

wherein when said reactor is in the adsorption mode, the adsorbent material in the reactor at least partially adsorbs the vapor phase as adsorbate vapor, and when said reactor is in the desorption mode, the adsorbent material in the reactor releases adsorbed vapor as desorbed vapor that is passed directly to the atomization unit where the desorbed vapor is at least partially condensed by the atomized liquid and collects as a liquid phase in the atomization unit.

2. The regenerative adsorption system as claimed in claim 1, comprising two reactors, one of the reactors operating in the adsorption mode and the other reactor operating in the desorption mode.

3. The regenerative adsorption system as claimed in claim 2, wherein the two reactors alternate between respectively operating in the adsorption mode and the desorption mode.

4. The regenerative adsorption system as claimed claim 3, wherein between operating between adsorption and desorption modes, the reactors undergo a switching cycle in which heated fluid resident in the reactor operating in the desorption mode is transferred to the reactor operating in the adsorption mode.

5. The regenerative adsorption system as claimed in claim 1, wherein the liquid atomization unit comprises a vessel containing the chamber, with one or more atomization devices located within the chamber.

6. The regenerative adsorption system as claimed in claim 5, wherein the atomization device comprises a spray nozzle.

7. The regenerative adsorption system as claimed in claim 6, comprising a plurality of spray nozzles provided on a spray head.

8. The regenerative adsorption system as claimed in claim 7, wherein the spray head extends substantially throughout the chamber.

9. The regenerative adsorption system as claimed in claim 6, wherein the spray nozzle is selected from the group consisting of a whirlwind chamber cone spray nozzle, a solid cone spray nozzle, an oval-orifice spray nozzle, a deflector spray nozzle, an impinging jet spray nozzle, a bypass spray nozzle, a poppet spray nozzle, a two fluid spray nozzle, and a vaned rotating wheel spray nozzle.

10. The regenerative adsorption system as claimed in claim 1, wherein the spray nozzle comprises an orifice having a diameter of about 0.2 mm to about 10 mm.

11. The regenerative adsorption system as claimed in claim 1, wherein the liquid is water.

12. The regenerative adsorption system as claimed in claim 1, wherein the cooled liquid is at a temperature in the range of about 5° C. to about 25° C.

13. The regenerative adsorption system as claimed in claim 1, wherein the adsorbent material comprises a bed of desiccant material, and wherein:

in the desorption mode, the desiccant material is heated with a heated fluid; and in the adsorption mode, the desiccant material is cooled with a coolant fluid.

14. The regenerative adsorption system as claimed in claim 13, wherein the heated fluid is at a temperature in the range between 70° C. to 100° C.

15. The regenerative adsorption system as claimed in claim 13, wherein the coolant fluid is at a temperature in the range between 20° C. to 40° C.

16. The regenerative adsorption system as claimed in claim 13, wherein the heated fluid is heated by a source of waste heat.

17. A regenerative adsorption process used in an adsorption system that comprises a reactor containing adsorbent material, the reactor operating alternatively in an adsorption mode and a desorption mode, the regenerative adsorption process comprising the steps of:
- atomizing a liquid to form adsorbate vapor or to condense desorbed vapor in a liquid atomization unit; and
- when the reactor is operating in the adsorption mode, passing adsorbate vapor directly to the reactor without the use of vapor valves, the adsorbent material adsorbing the adsorbate vapor; and
- when the reactor is operating in the desorption mode, passing desorbate vapor directly to the liquid atomization unit without the use of vapor valves; and
- condensing, using the atomized liquid, desorbed vapor generated from the adsorbent material.

18. An adsorption chilling system comprising:
- a pair of reactors containing adsorbent material, the reactors operating in an adsorption mode and a desorption mode respectively; and
- a pair of liquid atomization units that are respectively in fluid communication with the pair of reactors, the liquid atomization units at least partially atomizing a liquid to form an adsorbate vapor or at least partially condensing a desorbed vapor;

wherein
- the adsorbent material of the reactor operating in the adsorption mode adsorbs adsorbate vapor directly from the liquid atomization unit that is in communication with the reactor in an adsorption mode, and
- the adsorbent material of the reactor operating in the desorption mode releases desorbed vapor that is passed directly to the other liquid atomization unit in fluid communication with that reactor, said adsorbate and desorbate vapor not passing through vapor valves.

* * * * *